US012717596B2

(12) United States Patent
Pahilajani et al.

(10) Patent No.: US 12,717,596 B2
(45) Date of Patent: Aug. 25, 2026

(54) APPLICATION INTERFACE FUNCTIONALITY ENHANCEMENT

(71) Applicant: Oracle International Corporation, Redwood Shores, CA (US)

(72) Inventors: Haresh Pahilajani, San Jose, CA (US); Vignesh Nagarajan, Newark, CA (US); Kaarthik Balasubrahmanian, Belmont, CA (US); Sridhar Tadepalli, Bangalore (IN); John Vakoc, Castle Rock, CO (US); Subramanya Datta Panduranga Setty, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 189 days.

(21) Appl. No.: 18/769,109

(22) Filed: Jul. 10, 2024

(65) Prior Publication Data

US 2025/0138846 A1 May 1, 2025

Related U.S. Application Data

(60) Provisional application No. 63/594,540, filed on Oct. 31, 2023.

(51) Int. Cl.
*G06F 9/451* (2018.01)

(52) U.S. Cl.
CPC .................................... *G06F 9/451* (2018.02)

(58) Field of Classification Search
None
See application file for complete search history.

(56) References Cited

U.S. PATENT DOCUMENTS

| | | | |
|---|---|---|---|
| 9,395,965 | B2 | 7/2016 | Garimella et al. |
| 9,547,480 | B2 | 1/2017 | Donis et al. |
| 11,733,990 | B2 | 8/2023 | Martinsson |

(Continued)

FOREIGN PATENT DOCUMENTS

| | | |
|---|---|---|
| EP | 2378415 B1 | 7/2015 |

OTHER PUBLICATIONS

"Artifact Generator", Retrieved from https://softacus.com/extension-articles/doors/artifact-generator, Retrieved on Dec. 13, 2023, pp. 1-4.
"Creating Process Object Types", Retrieved from https://help.sap.com/docs/SAP_PROCESS_OBJECT_BUILDER/f7a11926cc9f432b8f9f5b106b392250/332791fcf0af4e7aae9d1ed9b59ffc05.html, Dec. 13, 2023, p. 3.
"Extensibility in the web UI framework for application developers", Retrieved from https://www.ibm.com/docs/hu/order-management?topic=center-extensibility-in-web-ui-framework-application-developers, Nov. 2, 2023, pp. 1-3.

(Continued)

*Primary Examiner* — Toan H Vu
(74) *Attorney, Agent, or Firm* — Invoke

(57) ABSTRACT

Techniques for extensions of graphical user interfaces (GUIs) are disclosed. The system executes an application that displays a GUI. The system selects one or more interface elements for displaying within the GUI at runtime while executing the application. The system identifies a primary data type corresponding to content that is to be displayed or currently being displayed by the GUI. The system determines that the primary data type is mapped to a first target data type. Responsive to determining that the primary data type is mapped to the first target data type, the system identifies a first function associated with the first target data type. The system generates a first interface element for initiating execution of the first function associated with the first target data type. The system displays the first interface element concurrently with a display of the content within the GUI.

20 Claims, 5 Drawing Sheets

(56) References Cited

U.S. PATENT DOCUMENTS

| | | | | |
|---|---|---|---|---|
| 12,266,058 | B2* | 4/2025 | Yoo | G06T 19/00 |
| 2011/0107295 | A1 | 5/2011 | Banavar et al. | |
| 2011/0208788 | A1 | 8/2011 | Heller et al. | |
| 2017/0329466 | A1* | 11/2017 | Krenkler | G06F 9/453 |
| 2019/0339849 | A1* | 11/2019 | Williams | G06F 3/0483 |
| 2020/0183556 | A1* | 6/2020 | Liu | G06F 3/011 |
| 2020/0329281 | A1* | 10/2020 | Zhang | G06F 3/04817 |
| 2021/0034834 | A1* | 2/2021 | Mackin | G07F 7/086 |
| 2021/0150214 | A1* | 5/2021 | Xu | H04N 23/62 |
| 2022/0137981 | A1 | 5/2022 | Goddard et al. | |
| 2023/0030320 | A1* | 2/2023 | Chung | G06F 9/453 |
| 2023/0394045 | A1* | 12/2023 | Nixon | G06F 16/252 |

OTHER PUBLICATIONS

“Generating Deployment Artifacts”, Retrieved from https://docs.tibco.com/pub/activematrix_businessworks/6.6.1/doc/html/GUID-B5834CA0-346B-48EB-876E-2844D42B69AD.html, Retrieved on Dec. 13, 2023, pp. 1-3.

“POT Generation”, Retrieved from https://help.sap.com/docs/SAP_PROCESS_OBJECT_BUILDER/f7a11926cc9f432b8f9f5b106b392250/e074cc88b90e4b9682ad705e393a3052.html, Dec. 13, 2023, pp. 4.

Reissmueller J., “Extension Generator”, Retrieved from https://docs.blesta.com/display/user/Extension+Generator, Oct. 22, 2021, pp. 1-4.

* cited by examiner

DISPLAY
412
INPUT
DEVICE
414
CURSOR
CONTROL
416
MAIN
MEMORY
406
ROM
408
STORAGE
DEVICE
410
BUS
402
PROCESSOR
404
COMMUNICATION
INTERFACE
418
400
NETWORK
LINK
420
428
INTERNET
ISP
426
SERVER
430
LOCAL
NETWORK
422
HOST
424

APPLICATION INTERFACE FUNCTIONALITY ENHANCEMENT

INCORPORATION BY REFERENCE; DISCLAIMER

Each of the following applications are hereby incorporated by reference: Application No. 63/594,540, filed Nov. 31, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to generating extensions for graphical user interfaces (GUIs).

BACKGROUND

A graphical user interface (GUI) is a type of user interface that enables users to interact with electronic devices through graphical icons and visual indicators rather than text-based commands. GUIs were developed to address the steep learning curve associated with command-line interfaces (CLIs), where users are required to type commands on a keyboard. Operations in a GUI are performed by directly manipulating graphical elements. GUIs are used in computers and in various handheld mobile devices, such as MP3 players, portable media players, gaming devices, and smartphones.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
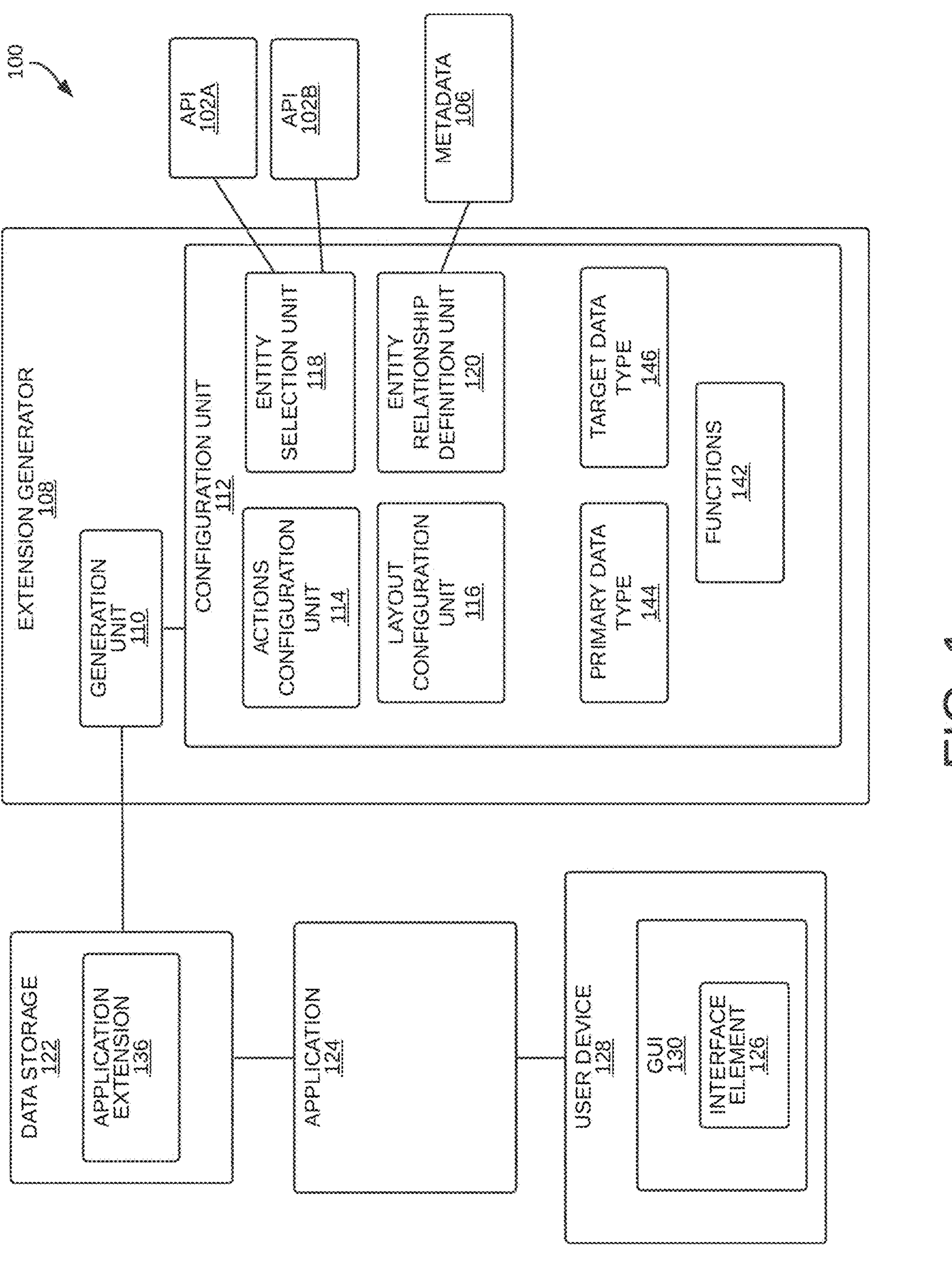
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. INTERFACE FUNCTIONALITY ENHANCEMENT ARCHITECTURE
3. ADDING FUNCTIONALITY TO AN INTERFACE BASED ON EXISTING INTERFACE FUNCTIONALITY
4. EXAMPLE EMBODIMENT
5. PRACTICAL APPLICATIONS, ADVANTAGES & IMPROVEMENTS
6. MISCELLANEOUS; EXTENSIONS
7. HARDWARE OVERVIEW

1. General Overview

One or more embodiments determine and add functionality to content presented by an application based on metadata corresponding to a set of target data types for the content. Initially, the system receives user input selecting the set of target data types for particular content presented by an application. Alternatively, or additionally, the system determines the set of target data types based on the particular content itself. The system identifies a primary data type corresponding to the particular content. Thereafter, the system analyzes an external Application Programming Interface (API) (and/or related metadata) to determine the target data types that are related to the primary data type. For example, a system may display an invoice view with attributes and functions related to an invoice type that is the primary data type for the invoice view. The system receives user input selecting a customer type and a product type as target data types for the invoice view. The customer type and product type represent additional functionality available to, but not yet incorporated by, an application.

One or more embodiments analyze metadata associated with a target data type to determine a function, or functions, that to be executed in relation to the target data type. The functions determined for the target data type include context-specific functions executable within a particular context and/or general functions executable from any context. In one example, a context-specific function determined for the target data type is associated with the primary data type corresponding to the particular context. The functions are determined via selection from a set of previously defined functions.

In an example, the primary data type for particular content is an invoice type and the target data type selected for the particular content is a customer type. Invoice type objects represent invoices and identify customers corresponding to the invoices. Customers are represented by customer type objects. The system determines a context-specific function based on metadata associated with the invoice type (primary data type for context) and customer type (selected target type). The context-specific function includes displaying the name of a customer from a customer object that is associated with a currently displayed invoice corresponding to an invoice object. Alternatively, or additionally, the system determines a general function associated with the customer type. In one example, the general function includes editing a customer type object.

The system generates interface elements that enable the execution of the functions related to the target data types. In an example, the system generates a panel in a Graphical User Interface (GUI) associated with a primary data type. The panel is associated with a target data type. The panel includes interface elements that allow for the selection of context-specific and/or general functions corresponding to the target data type.

One or more embodiments described in this Specification and/or recited in the claims may not be included in this General Overview section.

2. Interface Functionality Enhancement Architecture

In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Components may be distributed over multiple applications and/or machines. Multiple components may be combined into one application and/or machine. Operations described with respect to one component may instead be performed by another component.

FIG. 1 illustrates a system 100 in accordance with one or more embodiments. As illustrated in FIG. 1, system 100 includes extension generator 108, data storage 122, application extension 136, application 124, user device 128, GUI 130, interface element 126, generation unit 110, configuration unit 112, actions configuration unit 114, entity selection unit 118, layout configuration unit 116, entity relationship definition unit 120, primary data type 144, target data type 146, functions 142, API 102A and 102B, and metadata 106.

In accordance with an embodiment, application 124 is a computer program that performs specific tasks for end-users. Application 124 assists users in accomplishing various functions related to productivity, entertainment, creativity, or communication. Exemplary applications include sales software, word processing software, spreadsheet applications, graphic design software, database software, etc.

In accordance with an embodiment, application 124 is a sales software application. An exemplary sales software application encompasses a suite of essential tools that businesses rely on to automate sales processes, enhance the user experience, and optimize costs. For example, Customer Relationship Management (CRM) software centralizes customer interactions, lead tracking, and data management.

In accordance with an embodiment, application 124 produces graphical user interface (GUI) 130 at user device 128. GUI 130 is an interface that allows users to interact with electronic devices using visual elements, such as windows, icons, menus, cursors, and buttons. Unlike text-based interfaces that rely on typed commands, GUIs provide an intuitive way to navigate operating systems and software without extensive technical knowledge.

In accordance with an embodiment, user device 128 is a device, such as a cell phone, smartphone, tablet, laptop, or desktop used by an individual. In the example of FIG. 1, user device 128 runs application 124 and produces GUI 130.

In accordance with an embodiment, GUI 130 and application 124 define a context. The context is a set of data that identifies an application's tasks, origin, and/or configuration. Additionally, or alternatively, the context may include information related to the display at GUI 130, such as the functionality and/or data objects in a current GUI page.

In accordance with an embodiment, extension generator 108 creates application extension 136 for application 124. Extension generator 108 includes several modules, including generation unit 110, actions configuration unit 114, entity selection unit 118, layout configuration unit 116, and entity relationship definition unit 120. Extension generator 108 identifies primary data type 144 that corresponds to content displayed by GUI 130. Extension generator 108 determines that primary data type 144 is mapped to target data type 146 (such as using metadata 106). Extension generator 108 generates application extension 136 that produces interface element 126 in GUI 130.

In accordance with an embodiment, configuration unit 112 determines a configuration of application extension 136. The configuration includes functionality, layout actions for application extension 136, and interface element 126.

In accordance with an embodiment, entity selection unit 118 receives indications of primary data types from the user and/or from APIs, such as API 102A and 102B. In one example, the system determines primary data types from a context at an application, such as the context of a GUI page of GUI 130. The system receives a selection of one or more of the primary data types for further processing.

In accordance with an embodiment, APIs, such as API 102A and 102B, are a set of rules and protocols that allow different software applications and modules to communicate with each other. APIs enable the integration of various software components, services, or systems, allowing them to share data and functionalities seamlessly. In the example of FIG. 1, the system uses API 102A and 102B to determine the primary data types.

In accordance with an embodiment, entity relationship definition unit 120 determines a set of target data types from a determined primary data type. In one example, entity relationship definition unit 120 accesses metadata 106 to determine relationships between the primary data type and target data types.

In accordance with an embodiment, a data type is a category of data stored in a system for an application. For example, sales software employs data types to store details about products, customers, transactions, users, and other entities. A data type is a data object specifying attributes that define the data type. In one example, a "customer" data type has attributes "name" and "address", and a "product" data type has "product ID" and "product type" as attributes.

In accordance with an embodiment, a primary data type 144 is a data type that is incorporated or implemented by the application 124. The application 124 may cause the user device 128 to present the GUI 130 including an interface element 129 that corresponds to the primary data type 144. For example, the application may be configured to allow user to access a "Customer" data object. Accordingly, the interface element 126 may include a panel and icons, selectable by a user, to view and modify data in the "Customer" data object.

A target data type 146 is a data type is a data type associated with functionality that may be implemented, but may not yet be implemented, by the application 124. For example, the application 124 may cause the GUI 130 to display an interface element associated with a primary data type 144. A user interaction with the interface element 126 causes the application to perform operations associated with the primary data type 144. The extension generator 108 may cause the GUI 130 to display interface elements 126 associated with a target data type 146. The target data type 146 includes functions 142 that may be implemented by the application 124, but which are not yet implemented in the application 124. Based on a user interaction with an interface element 126 associated with the target data type 146, the extension generator 108 generates an application extension 136 to modify the application 124 to include the functions 142 associated with the target data type 146.

In one embodiment, the entity selection unit 118 identifies the primary data type 144. The entity selection unit 118 may identify the primary data type 144 based on a user selection or based on analysis of the application 124 to identify functionality associated with the application 124. In addition, the entity relationship definition unit 120 may identify the target data type 146 based on one or both of the primary data type 144 and the functions 142 associated with the application 124. For example, a user may interact with an interface element 126 in the GUI 130 to request the entity relationship definition unit 120 to identify any target data types 146 that include functions 142 that the application 124 may perform, but which the application 124 is not yet configured to perform.

In accordance with an embodiment, metadata 106 is data that provides information about other data, serving as a descriptive layer that helps users and applications to understand, manage, and utilize the primary data more effectively. Metadata includes various attributes that detail the characteristics, origin, and structure of the data, making it easier to organize, search, and analyze. In the example of FIG. 1, metadata 106 specifies relationships between data types, including between the primary data type 144 and the target data type 146. The metadata 106 allows entity relationship definition unit 120 to determine a set of target data types 146 based on a primary data type 144.

In accordance with an embodiment, the system identifies function 142 related to target data types for interface element 126 of application 124. For example, the system may identify a function 142 that would display the data of target data type 146 in the GUI 130. Additionally, or alternatively, the system may identify a function 142 to generate a link in the GUI 130 to the data of target data type 146. In one example, the system obtains data of the target data type from a data store as directed by application extension 136. Alternately, the system produces a link to data of the target data type as indicated by application extension 136.

In accordance with an embodiment, actions configuration unit 114 determines actions associated with the interface element 126. For example, actions initiate and execute functional tasks within the application. An exemplary action is the notes functionality shown in FIG. 3C described below. The notes functionality allows users to add notes to a GUI page. Actions configuration unit 114 determines the actions that are appropriate for interface element 126 using the target data information or by selecting default actions. In one example, metadata 106 associates data types with actions.

In accordance with an embodiment, layout configuration unit 116 determines a layout for interface element 126. The layout configuration arranges the display of data types, associated functionality, and actions for interface element 126. In one example, layout configuration unit 116 uses GUI 130 to determine a template for the layout configuration.

In accordance with an embodiment, generation unit 110 generates application extension 136 using configuration from configuration unit 112. Generation unit 110 uses layout configuration, data type information, action information, and function information to generate the application extension 136.

In accordance with an embodiment, data storage 122 stores and manages files. Data storage 122 is one or more of several types, including primary storage like RAM, which provide temporary and volatile memory for active data processing. Secondary storage involves non-volatile options, such as Hard Disk Drives (HDDs) and Solid-State Drives (SSDs), that offer substantial capacity for long-term data retention, with SSDs providing faster access speeds than HDDs; optical storage. Cloud storage services and/or Network-based solutions, including Network Attached Storage (NAS) and Storage Area Networks (SAN), facilitate centralized and efficient data management across multiple devices and users.

In accordance with an embodiment, application extension 136 is a consumable executable artifact for application 124. Application extension 136 is used by application 124 to generate the interface element 126 for GUI 130.

Figure 3A:
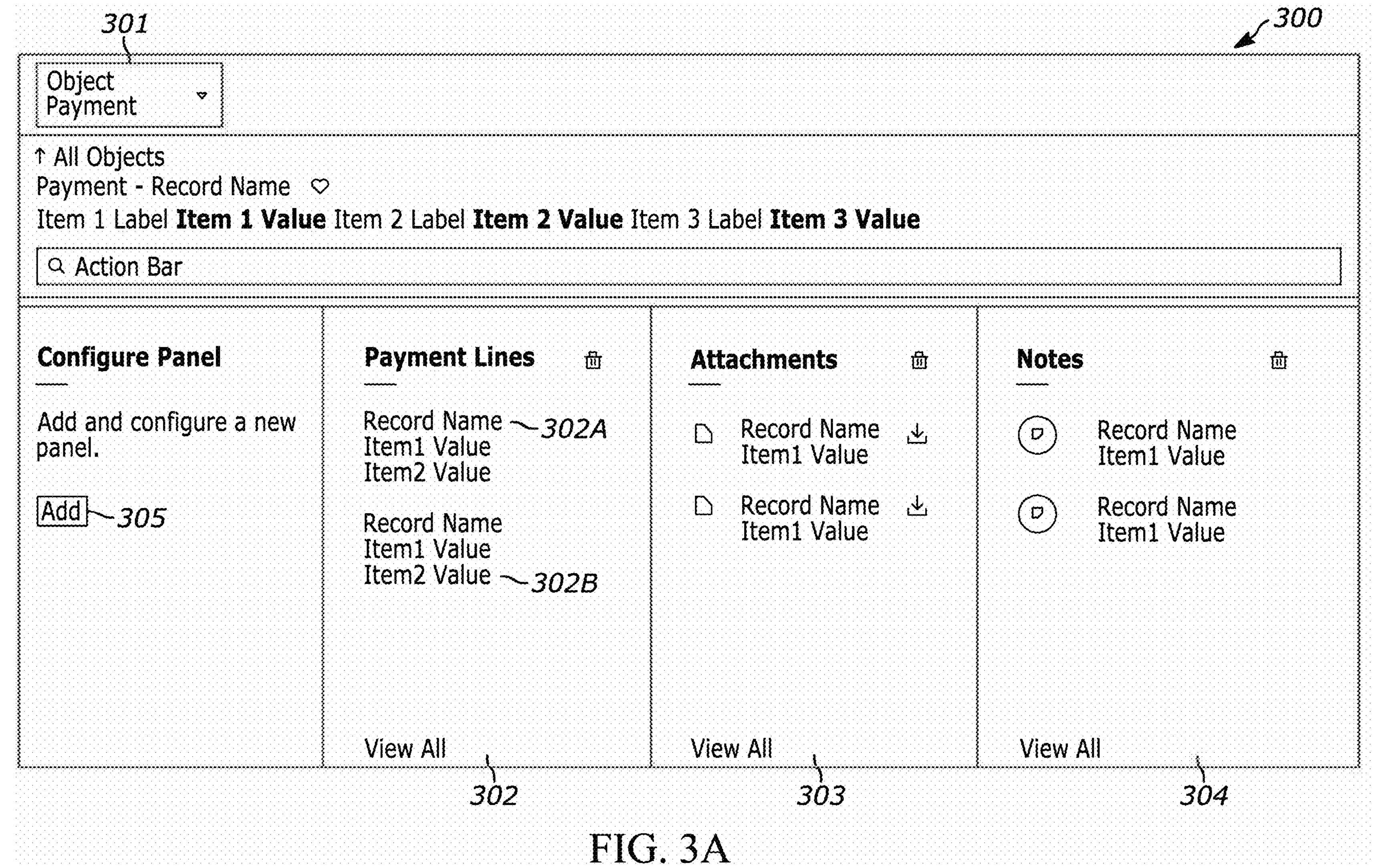
FIGS. 3A-3C illustrate example GUI displays for an extension generator system in accordance with one or more embodiments.

In accordance with an embodiment, interface element 126 is an extension of GUI 130. Interface element 126 includes selectable elements related to target data types and/or data of the target data types. FIG. 3A discussed below shows an exemplary interface element in a GUI page.

In one or more embodiments, a data repository (such as data storage 122) stores the application extension 136, metadata 106, and application configuration data for application 124 and extension generator 108 of system 100. The data repository is any type of storage unit and/or device (e.g., a file system, database, collection of tables, or any other storage mechanism) for storing data. Alternatively, a data repository includes multiple different storage units and/or devices. The multiple different storage units and/or devices may or may not be of the same type or located at the same physical site. Alternatively, a data repository is implemented or executed on the same computing system as the extension generator 108. Additionally, or alternatively, a data repository is implemented or executed on a computing system separate from the extension generator 108. The data repository is communicatively coupled via a direct connection or via a network.

In one or more embodiments, extension generator 108, data storage 122, application extension 136, application 124, user device 128, and GUI 130 refer to hardware and/or software configured to perform operations described herein for interface functionality enhancement. Examples of operations for interface functionality enhancement are described below with reference to FIG. 2.

In an embodiment, extension generator 108, data storage 122, application extension 136, application 124, GUI 130, interface element 126, generation unit 110, configuration unit 112, actions configuration unit 114, entity selection unit 118, layout configuration unit 116, entity relationship definition unit 120, primary data type 144, target data type 146, functions 142, API 102A and 102B, and metadata 106 are implemented and/or stored on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3. Adding Functionality to an Interface Based on Existing Interface Functionality In the world of Enterprise Applications, organizations typically have large-scale global deployment that involves working with multiple business entities. Creating a GUI application footprint for those business entities is quite complex and error prone. In addition, users need to be aware of the logical model of the business entity, which often changes as the business grows and transforms.

Users often want to access and configure application data and features during the runtime of the application to satisfy business needs and enhance user experience. Users expect such configurations to be made available on their devices through a seamless integration. When a user attempts to define such flows at runtime, complex workflows are involved. These include writing the code to create the UI artifacts, understanding the object model and internal names of the business entities, and creating configuration rules that govern the display of data conditionally based on the user's profile. There is also a need for knowledge and expertise to manage actions that initiate and execute functional tasks within the application. These complex workflows are time-consuming, error-prone, and furthermore, require users to have a deep understanding of the ever-evolving technology stack.

Figure 2:
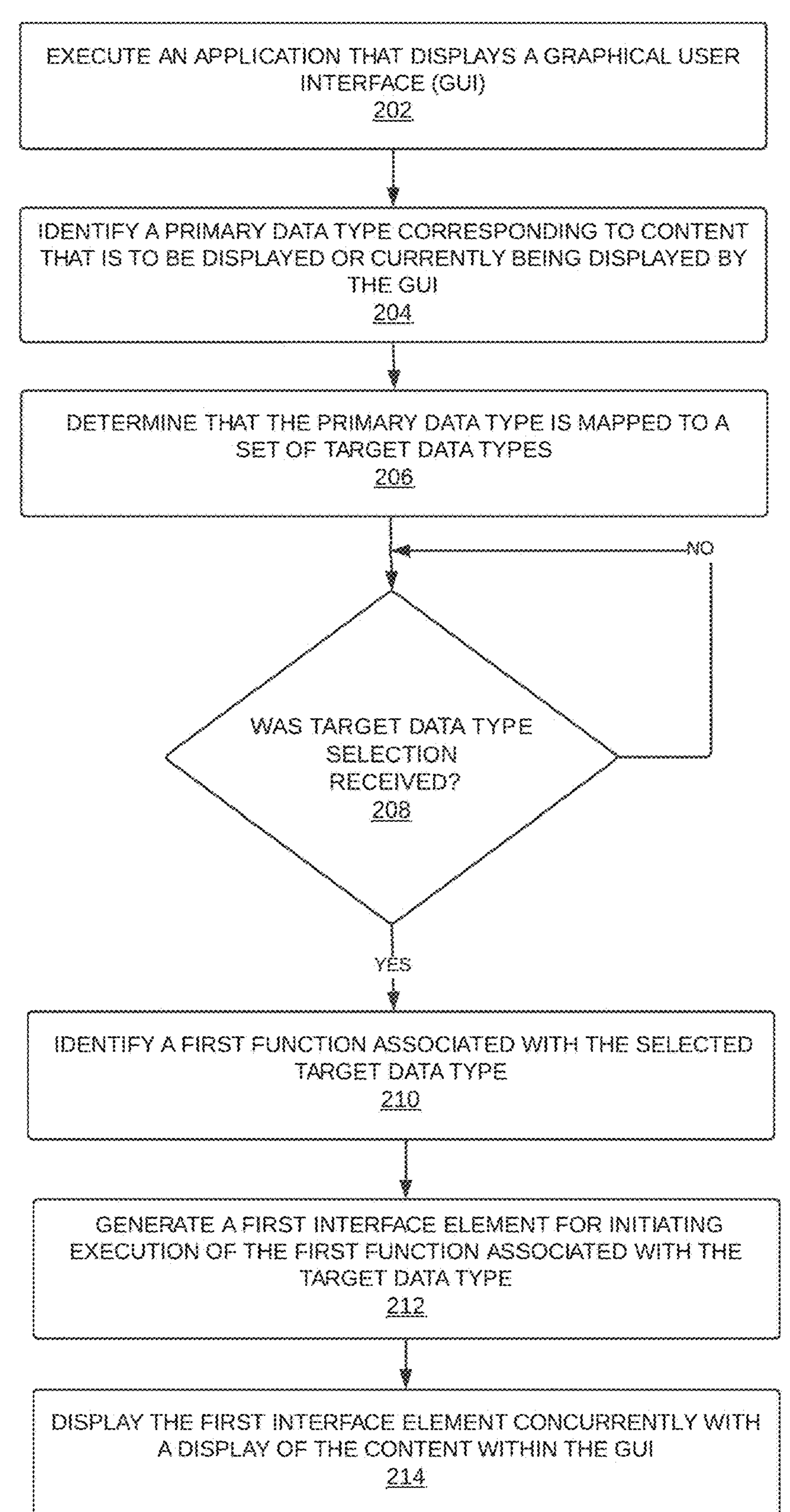
FIG. 2 illustrates an example set of operations for adding functionality to an interface in accordance with one or more embodiments.

FIG. 2 illustrates an example set of operations for adding functionality to a user interface in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the system executes an application that displays graphical user interface (GUI) (Operation 202). The GUI displays data for users of the application. In one embodiment, the data is associated with data types. A data type is a data object including attributes that define the data type. For example, sales software uses a variety of data types that capture information about products, users, transactions, and other related aspects. In one example, a "customer" data type has attributes "name" and "address", and a "product" data type has "product ID" and "product type" as attributes.

In an embodiment, the system identifies a primary data type corresponding to content that is to be displayed on or is currently displayed by the GUI (Operation 204). An exemplary primary data type of a GUI is "User" or "Product". In one example, a GUI display has multiple determined primary data types. In one embodiment, the system determines a primary data type by examining the data types that are displayed or will be displayed on a GUI page or element. Alternately, the system determines primary data types using an API for the application.

For example, the system identifies a primary data type corresponding to content that is currently displayed by a GUI. For example, a GUI includes a display of a "customer" data type such as by displaying attributes such as "name" and "address." The system identifies from the GUI that the name and address data displayed at the GUI relate to the "customer" data type and the "customer" data type is assigned as the primary data type.

According to another example, the system identifies a primary data type corresponding to content that is to be displayed by a GUI. In one example, the system stores a data structure or code corresponding to the GUI. The application uses the data structure or code to produce the GUI in response to a user selection. The system analyzes the data structure or code to determine the primary data type. The system determines that a GUI to be displayed will include data for a data type. For example, the system identifies from the data structure or code that the name and address data is to be displayed at the GUI related to the "customer" data type. The system then assigns the "customer" data type as the primary data type.

In an embodiment, the system determines that the primary data type is mapped to a set of target data types (Operation 206). In one example, the system determines a set of target data types by using metadata that associates data types. In one example, the metadata defines target data types associated with each data type.

In an embodiment, the system identifies various data types present within the application. The system categorizes these data types based on their attributes and functions. The system then generates metadata indicating relationships between data types. To indicate connections, the system includes relationship descriptors within the metadata. These descriptors specify the nature of the connection, such as hierarchical, associative, or referential relationships. When the application needs to understand the connections between data types, the system retrieves the relevant metadata. By analyzing the relationship descriptors within the metadata, the system identifies and interprets the connections between the data types.

In an embodiment, the system analyzes the interactions and dependencies between the data types to generate the relationship descriptors. For instance, the system identifies which data types reference others, which data types are composed of others, and how data types are linked through application logic. In one example, the system uses other applications or other GUI pages in the application to determine relationships between data types. In one example, the system uses machine learning or predefined rules and logic to determine relationships between data types.

In one embodiment, the system receives user input mapping the primary data type to the first target data type. The system then produces metadata indicating the mapping, such as with relationship descriptors. In one example, the relationship descriptors in the metadata are input into the system by administrators or other users.

In one embodiment, the system determines that the primary data type is mapped to the first target data type based on metadata associated with the first target data type or metadata associated with the primary data type. In an example, the metadata include relationship descriptors that indicate links between data types, such as between target and primary data types.

In one embodiment, the system accesses an API associated with an application to identify functions corresponding to target data types. For example, the system uses the API to determine functionality associated with data types, such as layouts, attributes to display or other functions. By examining the endpoints of the API, the system determines the specific actions or operations that the API supports. The system further analyzes the parameters associated with the API endpoint. For example, the system determines attributes or links to attributes to display at a interface element.

In one embodiment, the system analyzes an Application Programming Interface (API) to determine a target data type. For example, the system analyzes the parameters associated with API endpoints. By evaluating the required and optional parameters, the system determines the input data type. The system examines the data types and formats of these parameters to ensure proper integration with the application. The system further evaluates the expected responses for APIs. By analyzing the response structure, the system identifies the output data types provided by the API.

In one embodiment, the system determines a function associated with the target data type based on metadata associated with the first target data type. For example, the metadata indicates the functionality associated with data types, such as layouts, attributes to display or other functions. In one example, the system determines attributes or links to attributes to display at an interface element from the metadata.

In one embodiment, the function corresponds to an object of the target data type that is associated with an object of the primary data type, corresponding to the content. In one example, the function is the display or link to a display of the data type or data type attributes.

In one embodiment, the function corresponds to any object of the target data type. An exemplary determined function is a notes app or other functionality. An exemplary notes application of one embodiment is discussed with respect to FIG. 3C below.

Figures 3B, 3C:
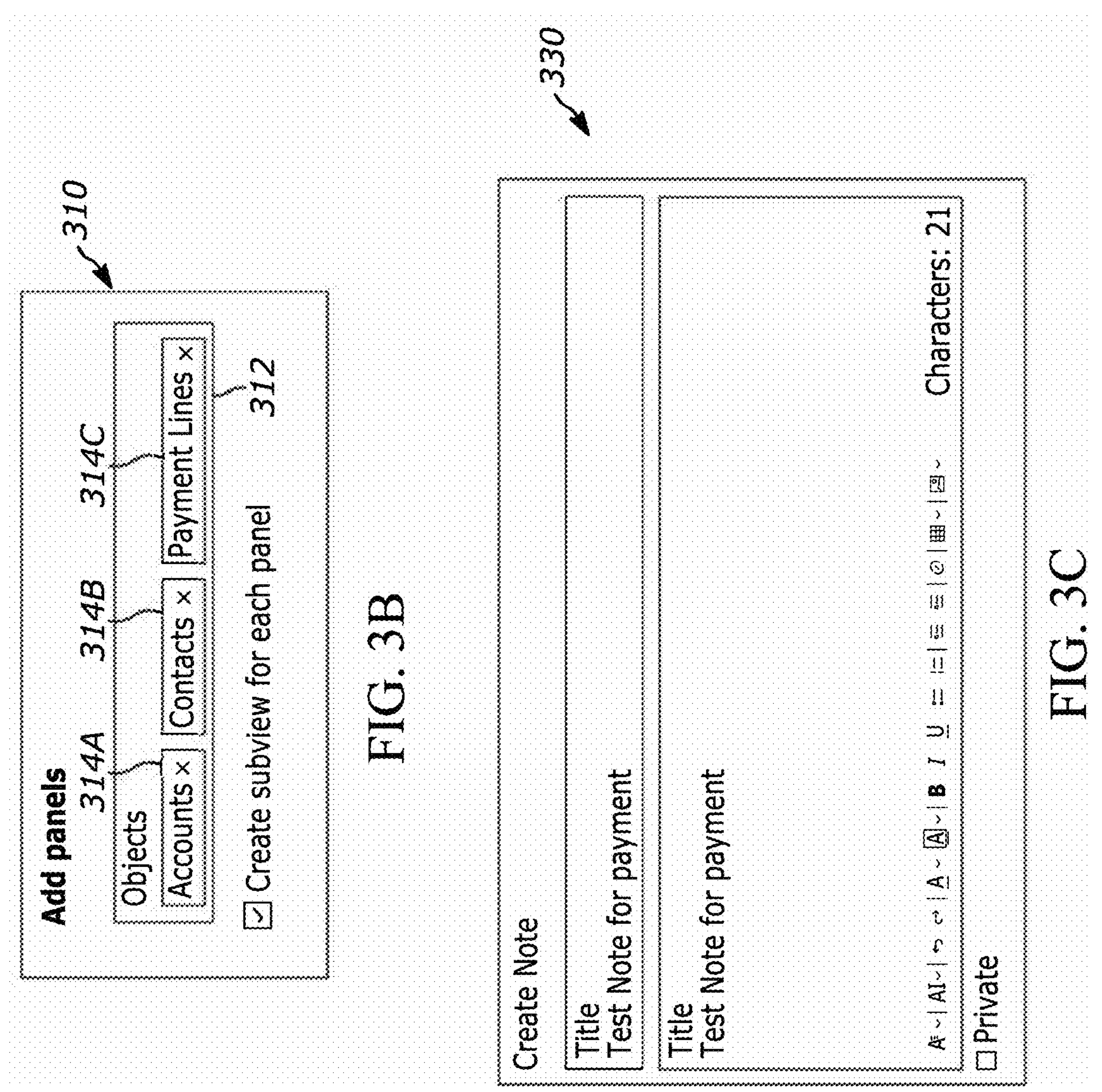

In an embodiment, the system checks for a selection of a target data type (Operation 208). The system presents the set of target data types to the user for selection. In one example, the system displays a GUI element, such as a button or a field, for selection of target data types. FIG. 3B below is an example of the display of the selectable target data types. The system receives input from the user to select one or more of the target data types. In an embodiment, the system allows uses to select multiple target data types target data types concurrently.

In an embodiment, the system identifies a function associated with the selected target data type (Operation 210). An exemplary function is a display or link to a display of data of the selected target data type. In one example, the system retrieves data of the selected target data type from a data store or generates a link to data of the selected target data type. Alternately, the system produces other functions related to the selected target data type. For example, the system may generate an input field to allow for modification of content stored by the selected target data type. The system may present a text box to allow for a modification of a visualization of a target data type. The system may present a dropdown menu, radio buttons, and checkboxes to display selectable functions for the target data type. The system may generate tables, charts, graphs, and other visualization elements, and/or navigation elements based on the selected target data.

In an embodiment, the system generates an interface element for initiating execution of the first function associated with the target data type (Operation 212). The system produces an interface element that displays the target data type or a link to the target data type. The interface element includes layouts and/or display elements that are automatically generated by the system. An example of an interface element is shown in FIG. 3A described below.

In an embodiment, the system generates executable artifact that is used to generate the interface element. The system generates an executable artifact by compiling and packaging the software components. The system creates a tangible, binary representation of the software program, for execution. During the build process, the system includes executable files, libraries, and other necessary dependencies to ensure the software can run on the target platform. For example, in a Java application, the system produces a JAR (Java Archive) file, while in a C++ application, the system creates an EXE (Executable) file. By doing this, the system prepares the executable artifact for deployment, installation, and execution on an end-user's system. In one example, the executable artifact is imported into an application development environment. The generated artifacts and interface extensions are editable by a user prior to, and subsequent to, implementing the artifact in the application.

In an embodiment, the system displays the first interface element concurrently with a display of the content within the GUI (Operation 214). FIG. 3A shows an example of an interface element that displays "product line" information. The system allows the GUI with the interface element to be available to other users. For example, an administrator configures the GUI to include the interface element with the target data type information without hand coding the interface element.

In an embodiment, the system determines relationships to identify target data types, generates the executable artifact based on the selected target data types, and executes the executable artifact to modify the GUI to include interface elements and functionality to perform functions associated with the target data types. This workflow speeds the construction of an updated GUI since it does not require a user to create code to expand the GUI.

4. Example Embodiment

FIGS. 3A-3C illustrate example GUI displays for an extension generator system in accordance with one or more embodiments. The GUI displays of FIGS. 3A-3C are merely illustrative. Other alternative displays may be used.

FIG. 3A shows a GUI 300 with an interface element 302. In an embodiment, interface element 302 adds payment line information selected by the user to a payment record of GUI 300. A payment line refers to a line item in a financial transaction record that details a specific payment. Payment lines are used in accounting, invoicing, and financial software to keep track of individual payments made against invoices, bills, or other financial obligations. In the example of FIG. 3A, payment line interface element 302 includes information about individual payments associated with a purchase.

In the example of FIG. 3A, the interface element 302 has a layout determined by the system to arrange the displayed information. In the example of FIG. 3A, interface element 302 includes functionality to view payments in a payment record. After a user interacts with the interface element 302, the system modifies the GUI 300 to display a payment record and information associated with the payment record, such as: Name, Date, and Amount. In one example, the system also provides functionality to edit payment records 302A and 302B.

In one example, the system analyzes the data types "Payment" 301, "Payment Lines" 302, "Attachments" 30, and "Notes" 304 presented in the GUI 300 of FIG. 3A to identify a set of target data types also be presented in the GUI 300. In the example illustrated in FIG. 3A, the GUI 300 includes an interface element 305 to "add" panels to the GUI 300. Selection of the interface element 305 causes the system to identify the target data types and corresponding functions associated with one or more of the data types 301-304 displayed in the GUI 300.

FIG. 3B shows a display 310 with field 312 that allows for selection of objects 314A, 314B, and 314C identified as target data types associated with one or more of the data types displayed in the GUI 300. Based on the user selection of the "add" interface element 305, the system analyzes relationship descriptors within metadata corresponding to the data types "payment" 301, "payment lines" 302, "attachments" 303, and "notes" 304 to identify additional data types and/or functions for the data types that are not included in the GUI 300. For example, the metadata may indicate that a "payment" data type is associated with a "payment lines" data type. The system then adds a "payment lines" interface element in a GUI page related to the "payments" data type. In the example of FIG. 3B, the system identifies objects 314A, 314B, and 314C as "target data types" that are associated with one or more of the "primary data types", 301-304. For example, the system suggests accounts (object 314A), contacts (object 314B), and payment lines (object 314C) for a payment page GUI, such as GUI 300 of FIG. 3A. In the example of FIG. 3B, the system may identify additional functions associated with the data object payment lines 302 already presented in GUI 300. The additional functions may not yet be included in GUI 300. Display 310 is used to select the accounts (object 314A), contacts (object 314B), and payment lines (object 314C) to add to a GUI. The user selects one or more of objects 314A-C. The system then generates user interfaces for the selected objects. FIG. 3A shows an example where a payment line object is selected, and the system produces a payment line interface element 302. In one example, the system produces multiple corresponding interface elements for GUI 300 when multiple objects 314A-C are selected concurrently.

FIG. 3C illustrates a display 330 of a "create notes" function that is added to the GUI 300 based on identifying the "create notes" function as a function corresponding to a target data type that was not previously incorporated in the GUI 300. For example, referring to FIG. 3A, the system may determine that the GUI has the functionality to display notes (e.g., records of the "Notes" data type 304). However, the GUI may be lacking the functionality to create new notes. For example, an application that generates and records payments may include functionality to include notes with the payments. However, the GUI 300 may be associated with an application to review payments initiated in another application. Accordingly, the GUI 300 may not include the functionality to create notes. Based on the user selecting the "Add" interface element 305, identifying the "create note" functionality as functionality associated with a target data type, and receiving a user selection to incorporate the "add notes" functionality with the target data type 304, the system generates an application extension to modify the payment review application to include the "create note" functionality. The application extension includes software to modify the payment review application to present the "Create Note" window 330 over the GUI 300 illustrated in FIG. 3A. The application extension further includes the software to modify the payment review application to receive text input in a "title" field and a "Note" field. The application extension further includes software to modify the payment review application to modify a "note"-type data object to include values entered by a user in the window 330. The system executes the application extension to modify the application to include the functionality to create a note, as illustrated in FIG. 3C.

5. Practical Applications, Advantages, & Improvements

Using an extension generation system has several advantages. Traditionally, creating GUI elements involves complex workflows, include writing code for GUI components, understanding the object model and internal names of business entities, and creating configuration rules that conditionally display data based on the user's profile. Additionally, managing actions that initiate and execute functional tasks within the application requires specialized knowledge and expertise. These processes are time-consuming and error-prone, demanding users to have a deep understanding of the constantly evolving technology stack. The automated extension generation system saves user time and system energy as well as allows less skilled users to produce GUI extensions. The system reduces the time and effort required for manual GUI updates by automating tasks associated with GUI modifications. Such automation accelerates the development process, increasing overall efficiency. Additionally, the system enables the GUI to scale effortlessly with the addition of new features and modules, supporting a growing number of users and data inputs without compromising performance. The system minimizes human errors associated with manual GUI updates by implementing standardized processes for extension generation, enhancing reliability and accuracy. This error reduction improves the overall quality and dependability of the GUI.

6. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
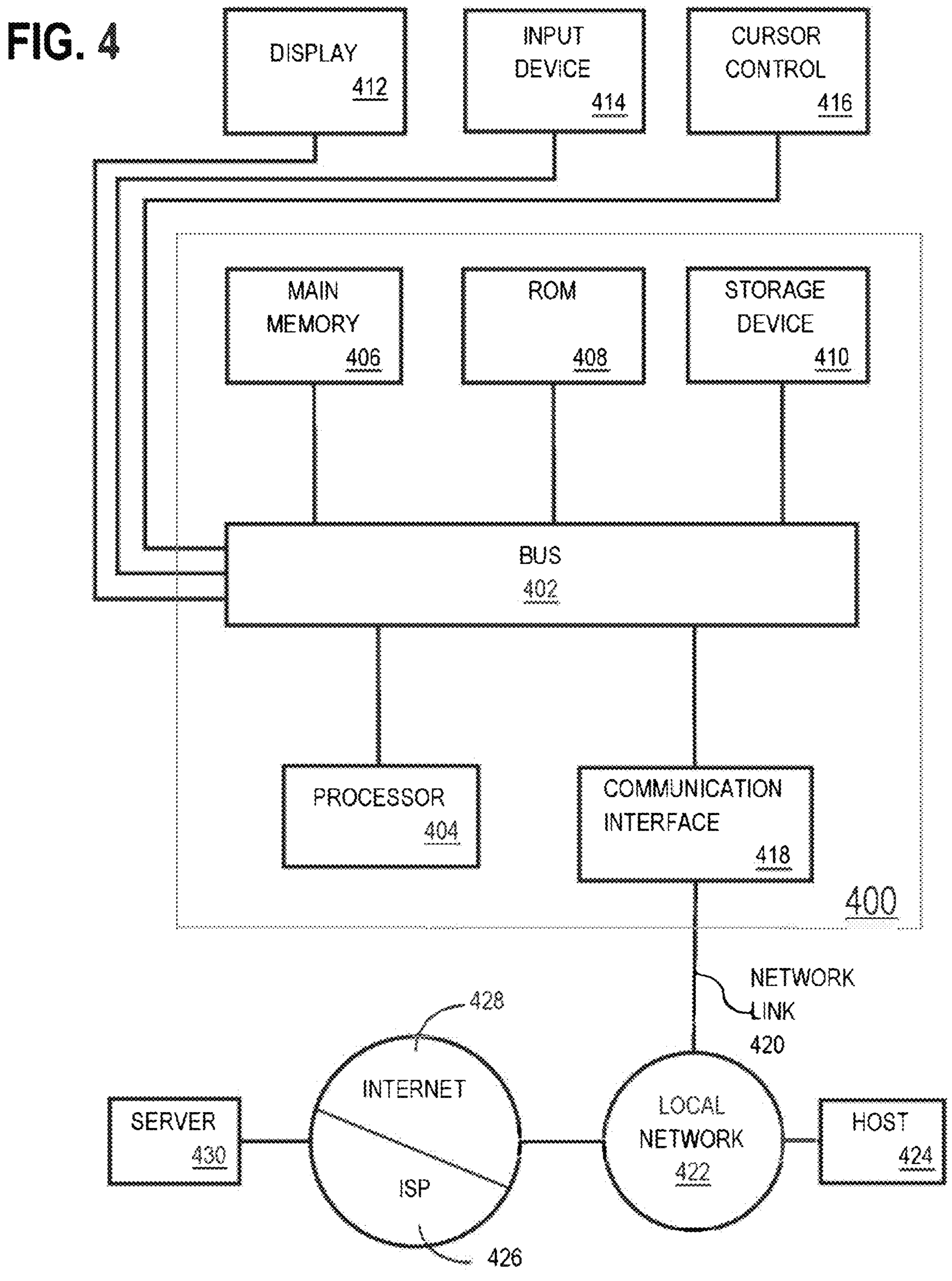
FIG. 4 shows a block diagram that illustrates a system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

What is claimed is:

1. A non-transitory computer readable medium comprising instructions which, when executed by one or more hardware processors, causes performance of operations comprising:

executing an application that displays a graphical user interface (GUI); and generating, at runtime while executing the application, one or more interface elements for displaying within the GUI at least by:

identifying a primary data type corresponding to content that is to be displayed or is currently being displayed by the GUI;

determining that the primary data type is mapped to a first target data type; and responsive to determining that the primary data type is mapped to the first target data type:

identifying a first function associated with the first target data type;

generating a first interface element for initiating execution of the first function associated with the first target data type; and displaying the first interface element concurrently with a display of the content within the GUI.

2. The non-transitory computer readable medium of claim 1, wherein determining that the primary data type is mapped to the first target data type is based on metadata associated with the first target data type or metadata associated with the primary data type.

3. The non-transitory computer readable medium of claim 1, wherein determining that the primary data type is mapped to the first target data type is in response to receiving, by the application, user input mapping the primary data type to the first target data type.

4. The non-transitory computer readable medium of claim 1, wherein the operations further comprise: determining the first function associated with the first target data type based on metadata associated with the first target data type.

5. The non-transitory computer readable medium of claim 1, wherein the first function corresponds to an object of the first target data type that is associated with an object, of the primary data type, corresponding to the content.

6. The non-transitory computer readable medium of claim 1, wherein the first function corresponds to any object of the first target data type.

7. The non-transitory computer readable medium of claim 1, wherein the operations further comprise analyzing an Application Programming Interface (API) to determine the first target data type.

8. A method comprising:

executing an application that displays a graphical user interface (GUI); and generating, at runtime while executing the application, one or more interface elements for displaying within the GUI at least by:

identifying a primary data type corresponding to content that is to be displayed or is currently being displayed by the GUI;

determining that the primary data type is mapped to a first target data type; and responsive to determining that the primary data type is mapped to the first target data type:

identifying a first function associated with the first target data type;

generating a first interface element for initiating execution of the first function associated with the first target data type; and displaying the first interface element concurrently with a display of the content within the GUI.

9. The method of claim 8, wherein determining that the primary data type is mapped to the first target data type is based on metadata associated with the first target data type or metadata associated with the primary data type.

10. The method of claim 8, wherein determining that the primary data type is mapped to the first target data type is in response to receiving, by the application, user input mapping the primary data type to the first target data type.

11. The non-transitory computer readable medium of claim 8, further comprising:

determining the first function associated with the first target data type based on metadata associated with the first target data type.

12. The method of claim 8, wherein the first function corresponds to an object of the first target data type that is associated with an object, of the primary data type, corresponding to the content.

13. The method of claim 8, wherein the first function corresponds to any object of the first target data type.

14. The method of claim 8, further comprising:

analyzing an Application Programming Interface (API) to determine the first target data type.

15. A system comprising:

at least one device including a hardware processor;

the system being configured to perform operations comprising:

executing an application that displays a graphical user interface (GUI); and generating, at runtime while executing the application, one or more interface elements for displaying within the GUI at least by:

identifying a primary data type corresponding to content that is to be displayed or is currently being displayed by the GUI;

determining that the primary data type is mapped to a first target data type; and responsive to determining that the primary data type is mapped to the first target data type:

identifying a first function associated with the first target data type;

generating a first interface element for initiating execution of the first function associated with the first target data type; and displaying the first interface element concurrently with a display of the content within the GUI.

16. The system of claim 15, wherein determining that the primary data type is mapped to the first target data type is based on metadata associated with the first target data type or metadata associated with the primary data type.

17. The system of claim 15, wherein determining that the primary data type is mapped to the first target data type is in response to receiving, by the application, user input mapping the primary data type to the first target data type.

18. The system of claim 15, wherein the operations further comprise: determining the first function associated with the first target data type based on metadata associated with the first target data type.

19. The system of claim 15, wherein the first function corresponds to an object of the first target data type that is associated with an object, of the primary data type, corresponding to the content.

20. The system of claim 15, wherein the first function corresponds to any object of the first target data type.

* * * * *